June 20, 1950

R. J. WISE

FACSIMILE RECORDING APPARATUS WITH SCANNER INSIDE DRUM 2,511,892

Filed Aug. 9, 1945

2 Sheets-Sheet 1

INVENTOR.
R. J. WISE

BY A. A. Thomas

ATTORNEY

June 20, 1950 R. J. WISE 2,511,892

FACSIMILE RECORDING APPARATUS WITH SCANNER INSIDE DRUM

Filed Aug. 9, 1945 2 Sheets-Sheet 2

INVENTOR.
R. J. WISE

BY A. A. Thomas

ATTORNEY

Patented June 20, 1950

2,511,892

UNITED STATES PATENT OFFICE 2,511,892

FACSIMILE RECORDING APPARATUS WITH SCANNER INSIDE DRUM

Raleigh J. Wise, Dunellen, N. J., assignor to The Western Union Telegraph Company, New York, N. Y., a corporation of New York Application August 9, 1945, Serial No. 609,756

41 Claims. (Cl. 346—24)

This invention is for a facsimilie recorder containing novel features which specially adapt the machine to record on paper of cardlike stiffness, so that the facsimile records thus made can be filed or handled like any other business records in card form. As an example of the commercial application of my new card recorder, I may mention its use by airlines in handling requests for space.

Heretofore applications for plane reservations received at a central point would be telephoned to the airfield office where an operator would take down the information given him. This procedure involved not only a loss of time but the possibility of mistakes in writing down the telephoned data.

The recording machine of my invention eliminates those objections. The application filled in at the central office is put in a transmitter and in a few minutes the recorder at the airfield office produces a facsimile card which is essentially identical with the original. These facsimile cards can be put up on a board where the operator can easily see the reservation requests on file.

My new card recorder is a simple and compact machine which performs its functions in automatic sequence after the machine has been started. The recording paper is fed from a supply roll into a flexible shell or former which closes and holds the paper in a cylindrical shape for internal scanning by a rotary stylus. At the end of a recording the cylindrical former opens, another length of paper is fed in from the supply roll, and the recorded portion is projected out of the open former. Shears then clip the protruding strip and the flexible cylinder closes with fresh paper inside. In the meantime the stylus returns to initial position and the machine is ready for the next recording.

This automatic facsimile recording on cards is the result of various features of novelty that will be fully explained in the description of the accompanying drawings wherein.

Figures 1, 2, 3, 4:
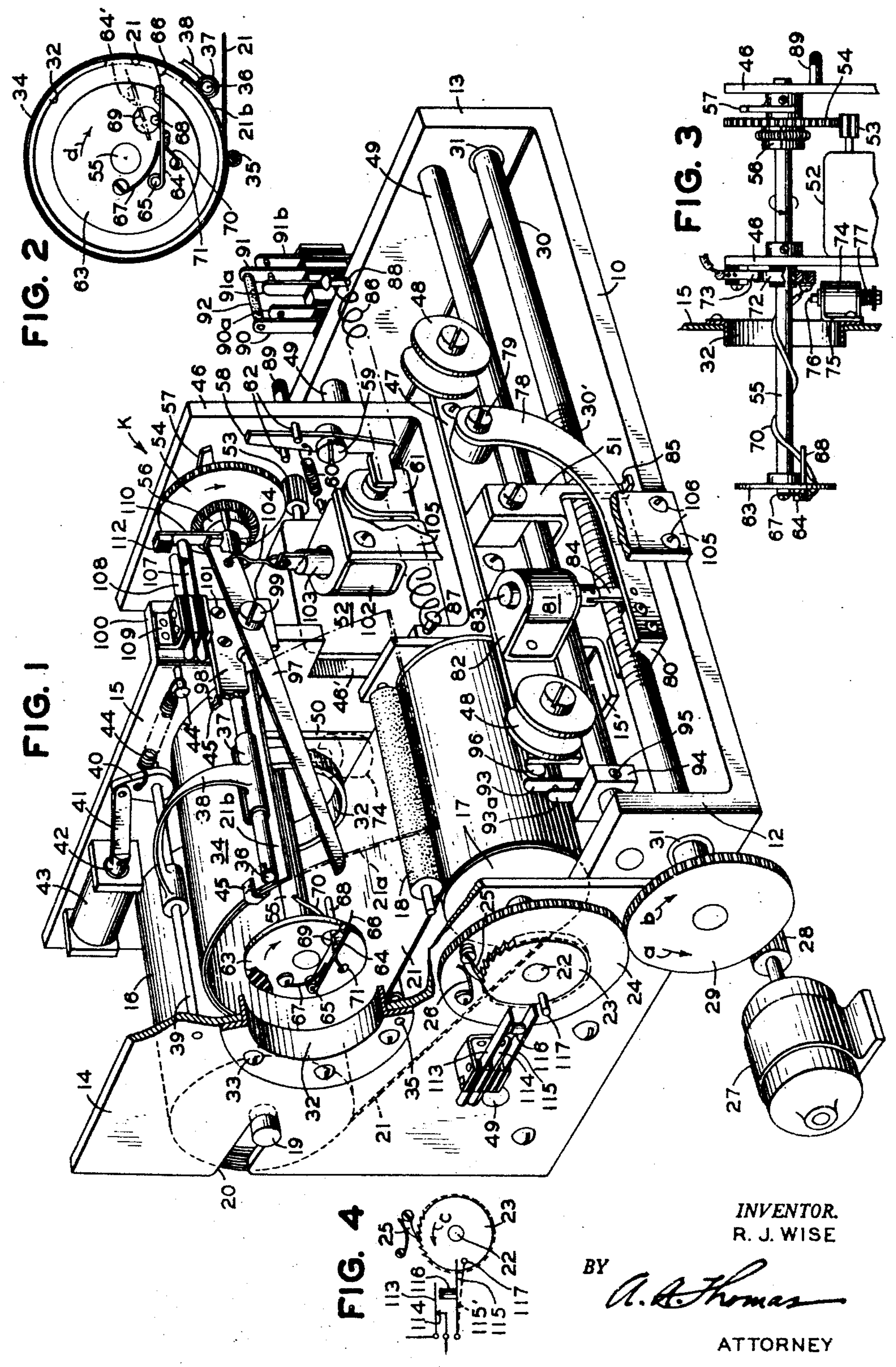
Fig. 1 shows a perspective of a card recorder constructed in accordance with my invention, certain parts being broken away for clearness.
Fig. 2 is an end view showing the stylus in recording position inside the closed cylinder.
Fig. 3 is a side view of the stylus mounting.
Fig. 4 shows certain details of a switch for controlling the paper feed operation.

Referring to Fig. 1, the base 10 and its integral end plates 12 and 13 serve as the main support for various parts of the apparatus. Two upright plates 14 and 15, suitably secured to the base 10, support a paper supply roll 16 and a pair of feed rollers 17 and 18 between which the paper is frictionally held for feeding. The plate 14 may be directly fastened to the end plate 12 and the plate 15 may have a lateral flange 15' for attachment to the base. The shaft 19 of supply roll 16 is mounted in rear slots 20 of plates 14 and 15 so that a new roll is easily inserted. The recording paper 21, which is of the electrosensitive type, passes from the supply roll 16 around the lower feed roller 17, which is motor driven to feed the paper rearward into recording position. Since the paper 21 which receives the recording is generally known in the facsimile art as recording paper, I shall use this term throughout the specification and claims. The shaft 22 of roller 17 extends through plate 14 and has a ratchet wheel 23 fixed thereon. A gear 24 is loosely mounted on shaft 22 next to the ratchet wheel 23 and has a pivoted pawl 25 which a spring 26 presses against the ratchet teeth. The gear 24 is coupled to a reversible electric motor 27 through a pinion 28 and a gear 29 which give the requisite speed reduction. The gear 29 is fixed on a rotary shaft 30 which is journaled in bearings 31 in the end plates 12 and 13 of the base.

It is clear that when the gear 29 rotates in the direction of arrow *a*, the gear 24 turns clockwise and the pawl 25 rides idly over the ratchet teeth, so that the feed roller 17 is not operating. However, when the motor 27 drives the gear 29 in the direction of arrow *b* to reverse the rotation of gear 24, the pawl 25 locks with the ratchet wheel 23 and the feed roller 17 is operated. As will be explained later, the roller 17 rotates exactly one turn to feed a definite length of paper into recording position, whereupon the roller stops until the next feeding operation is due.

The upright plates 14 and 15 are provided with aligned openings in which annular metal flanges 32 are suitably secured, as by screws 33. These flanges extend toward each other in axial alignment and constitute short cylindrical supports for the opposite edges of the paper so that the inner surface of the paper remains uncovered for internal recording. A flexible band or shell 34 is mounted at one end between the plates 14 and 15 on a pivot rod 35 arranged below the flanges 32 which the band overlaps. This band is preferably a piece of flexible sheet metal, such as Phosphor bronze, but it can also be made of nonmetallic material like rubberized cloth. The essential function of the flexible band 34 is to receive the paper from the roller 17 and curve or wrap it into cylindrical form for scanning. Hence I call this band a flexible cylindrical former or wrapper for the recording paper, which is held by its own resilience in firm contact with the cylindrical wall of the former 34. As shown in Fig. 2, there is enough clearance between the flanges 32 and the pivotal mounting 35 of former 34 to permit the insertion of the paper 21.

The free or non-pivoted end of band 34 is fastened to a rod 36 carried by a sleeve 37 on a curved arm 38 which extends over the band and is mounted on a rotary shaft 39 supported by the plates 14 and 15. A short arm 40 fixed on shaft 39 is connected by a link 41 to the core or plunger 42 of a solenoid 43, which may conveniently be mounted on the plate 15. A coil spring 44 is connected at one end to a pin 44' on plate 15 and at the other end to the arm 40. When the solenoid 43 is energized, the shaft 39 is rocked to raise the arm 38 which opens the cylindrical former 34, as shown in Fig. 1. Upon deenergization of magnet 43 the spring 44 instantly rocks the shaft 39 the other way so that the arm 38 swings down to close the former 34 and hold the paper in cylindrical form for recording, as illustrated in Fig. 2. The timing of magnet 43 will be explained in the description of Fig. 5.

The flexible band or wrapper 34 is provided at or near its free end with a pair of clips 45 secured to the outside of the band and extending under it to form guides for the paper during the feeding operation. These clips also serve to connect the free end of the paper to the band 34, so that the paper moves up with the flexible band when the latter is opened.

It is clear from what has been said that as the stiff resilient paper is fed into the open shell or band 34, it follows the curvature of the band, so that the subsequent closing of the band by spring 44 bends the paper around the annular flanges 32 and holds it in cylindrical form. We have, then, a novel form of drum structure with a flexible wrapper 34 which receives a flat piece of stiff paper and automatically coils it into a closed cylindrical shape, leaving the inside surface of the paper uncovered for recording. I would also call attention to the compactness of the paper feeding and forming mechanism which is mounted between the upright plates 14 and 15 in a comparatively small space.

The recording paper 21 is here assumed to be of card-like stiffness—say, like the well known 3x5 filing cards—so that the natural resilience of the paper causes it to follow smoothly and easily the S-shaped path provided by the feed roller 17 and the cylindrical shell 34, whereby the paper is automatically curved into a cylindrical form for scanning. The parallel and contiguous arrangement of the feed roller 17 and the cylindrical shell 34 to provide an S-shaped path for the paper is one of the important features of this machine. The paper itself, I may add, forms no part of the present invention, for it is of the type disclosed in my Patent No. 2,294,146, dated August 25, 1942. To give the paper the desired stiffness I may add another layer of suitable material or otherwise increase the thickness of the paper.

I will now take up the recording mechanism. To the right of plate 15 is a slidable carriage assembly indicated as a whole by K which has a U-shaped frame 46 for slidably supporting the assembly as a unitary structure. A bar 47 is attached to each side of the frame 46 and carries rollers 48 which run on a pair of guide rods 49 mounted in the end plates 12 and 13 of base 10. In this particular instance the upright plate 15 is cut away at 50 to make room for the movements of carriage assembly K. A bracket 51 extends from each side of the frame 46 under the adjacent guide rod 49 to hold the carriage assembly on the rods.

A synchronous motor 52 mounted in frame 46 has a pinion 53 in mesh with a gear 54 on a rotary shaft 55. The gear 54 is connected to the shaft 55 through a suitable friction clutch 56 so that the gear can rotate even when the shaft is locked. An arm 57 fixed on shaft 55 is so arranged as to strike the top of a latch 58 pivoted at 59 to the adjacent side of frame 46. A spring 60 normally rocks the latch into the path of arm 57 and a phasing electromagnet 61 moves the latch away from the arm. Stop pins 62 limit the movements of latch 58. As long as the magnet 61 is deenergized, the spring 60 holds the latch 58 against the arm 57 so that the shaft 55 does not rotate even though the motor 52 is running. The moment the magnet 61 is energized by a phasing signal from the transmitter, the latch 58 releases the shaft 55 and the machine is ready to start in phase with the transmitter. I need not say anything more about this phasing operation for it is well known in the art. See, for example, Wise Patent 2,311,803, dated February 28, 1943.

The shaft 55 extends axially through the circular flange 32 of plate 15 into the cylindrical former 34. The free end of shaft 55 carries an insulating disc 63 on which an electric recording stylus is mounted. This stylus comprises a conducting arm 64 pivoted on a pin 65 and carrying at its free end a stylus point 66, which may be secured by solder or otherwise. A leaf spring 67 constantly presses against the arm 64 to keep the stylus point 66 in recording contact with the inner surface of paper 21. A pin 68 extends laterally from the arm 64 through a hole 69 in disc 63. When the point 66 is not in contact with the paper, the pin 68 limits the outward movement of arm 64 under pressure of spring 67. A conductor 70 extends through a hole 71 in disc 63 and is soldered to the arm 64 to connect the stylus point 66 in the recording circuit. For convenience I shall hereinafter designate the stylus as a whole by the numeral 64.

Referring to Fig. 3, the stylus shaft 55 carries an insulated slip ring 72 to which the other end of conductor 70 is connected. This conductor is preferably a flexible wire coiled loosely around the shaft 55 to allow free movement of the stylus about its pivot 65. An insulated brush or finger 73 is mounted on the adjacent side plate of frame 46 and constantly engages the slip ring 72 so that the rotary stylus is always electrically connected to the brush. It is desirable to keep the stylus 64 away from the paper during the feeding operation, and for this purpose I use an electromagnet 74 which may conveniently be mounted on the stationary plate 15, as by means of a bracket 75. When the frame 46 which carries the stylus shaft 55 has moved from its final or extreme left position, as shown in Fig. 3, to its initial position at the extreme right, the pin 68 on stylus 64 is over the plunger 76 of magnet 74. Therefore, when the magnet is energized, the rising plunger strikes the pin 68 and throws the stylus into the position indicated by the dotted outline 64' in Fig. 2, where the stylus point is clear of the paper. A coiled spring 77 normally holds the plunger 76 in downward position.

I will now describe how the carriage assembly

K is operated. One of the side bars 47 on frame 48 has an arm 78 pivoted at 79 and the free end of this arm carries a half nut 80 arranged to engage the screwthreads 30' of shaft 30. As previously explained, the shaft 30 is driven by the reversible motor 27 through speed reducing gears 28 and 29. An electromagnet 81 is suitably attached to the side bar 47, as by a bracket 82, and the plunger 83 of this magnet is connected to the pivoted arm 78 by a link 84. The arm 78 normally hangs down by gravity against a stop 85 which may be an extension of the hook 51, and in this position of the arm the half nut 80 is out of contact with screw shaft 30. When the magnet 81 is energized, the plunger 83 rocks the arm 78 upward and thereby pulls the half not into mesh with the screw shaft. Upon deenergization of magnet 81 to release the half nut 80 from shaft 30, a strong coil spring 86 instantly pulls the carriage assembly to its initial position at the extreme right. The ends of coil spring 86 are connected to a pin 87 on frame 46 and a pin 88 on base plate 13.

The carriage assembly K has a definite length of travel from the initial position at the right to the final position at the left. Figs. 1 and 3 show the carriage assembly in final position at the end of a recording operation. An insulated pin 89 on the carriage frame 46 controls a set of switches comprising three pairs of contacts 90—90*a*, 91—91*a* and 91—91*b*, which may be mounted as a unit on the base plate 13. The contacts 90 and 91 are spring blades connected by an insulating rod 92 and movable together. The spring blade 90 stands normally in open position. The other spring blade 91 normally closes the contact 91*a* and opens the contact 91*b*. When the carriage is in its initial position, the pin 89 holds the two pairs of contacts 90—90*a* and 91—91*b* closed, while the contacts 91—91*a* remain open. We shall see later what the operation of these contacts brings about. It may be noted that this switch assembly also acts as a mechanical stop for the carriage, or a separate stop may be provided.

Another pair of electric contacts 93—93*a* determines the final position of carriage K. These contacts, which are normally open and shown as spring blades, are mounted on an insulating block 94 secured on one of the guide rods 49. The block 94 is adjustable on the guide rod 49 and clamped in correct position by a set screw 95 or otherwise. The adjacent side bar 47 has a pin or extension 96 arranged to strike the spring blade 93 and close the contacts. This happens only when a recording is finished and the carriage is at the end of its forward or extreme left movement. The operations that automatically follow the closing of contacts 93—93*a* will be fully explained in connection with the control circuits of Fig. 5.

When fresh paper is fed into the cylindrical shell or former 34 after a recording operation, the recorded portion or section of the paper is automatically pushed out of the former, as indicated by the dotted outline 21*a* in Fig. 1. This recorded strip is projected between a pair of cutters or shears 97—98. The lower shear member 97 is pivoted at 99 on a flange 100 of plate 15. The upper shear member 98 is stationary and is fastened at its ends to the plates 14 and 15. To keep Fig. 1 as clear as possible only the right portion of shear member 98 is shown where it is secured to the flange 100 of plate 15 by screws 101. The pivot screw 99 may extend through the end of plate 98 into the supporting flange 100. Any other practical form of mounting may be used for the shears 97—98, it being only necessary to have the cutting line at the proper distance from the free end of the cylindrical former 34 and parallel therewith.

The movable blade 97 normally hangs down to leave the shears open for passage of the recorded strip. To operate the blade 97 I have provided an electromagnet 102 which has a plunger 103 connected to the rear end of the blade by a link 104. The magnet 102 is mounted on the upper end of an upright bar 105 which is fastened to the base 10 by screws 106. It has been necessary to break away a portion of bar 105 in Fig. 1 to show other parts behind it, but the mounting of the stationary magnet 102 is clear enough. When the magnet 102 is energized at the proper moment, as will appear later, the blade 97 clips off the protruding recorded strip before the band 34 closes for the next recording. Either gravity or a spring may be depended upon to open the shear blade 97 when the magnet 102 is deenergized. In the particular design of Fig. 1 the left end of frame 46 is cut away at 46' to clear the projecting magnet 102 for the movements of carriage K.

I utilize the cutting movement of shear blade 97 to deenergize the magnet 43 and thereby allow the spring 44 to close the flexible band 34 for the next recording operation. For this purpose, I provide a pair of insulated contacts 107—108 which may be mounted on the lateral flange 100 of plate 15 in any practical way, as by a bracket 109. The contact 107 is a spring arm normally closed against the contact 108. The rear end of shear blade 97 has a vertical extension 110 provided with an insulated projection 112. When the shear blade 97 is operated by the magnet 102, the descending projection 112 opens the switch arm 107 at the end of the cutting operation. It is enough to say here that the breaking of switch contacts 107—108 results in magnet 43 becoming deenergized. The circuits involved in this operation will be explained in connection with Fig. 5.

The paper feeding operation of motor 27 is controlled by a pair of insulated contacts 113—114 mounted on the plate 14 in any practical way. The contact 113 is a movable spring arm normally closed against the contact 114. A spring blade 115 carrying a weight 116 is pivotally mounted below the contacts 113—114 and extends at its free end into the path of a pin 117 on the ratchet disc 23. Normally, the pin 117 is slightly below the free end of spring blade 115. As the ratchet disc 23, when rotated by the pawl 25 in the direction of arrow *c*, is about to complete one turn, the pin 117 moves the spring 115 down to position 115' and releases it exactly when the pin is back in its initial position. When the tensioned spring blade 115 is released, it flies upward and the weight 116 throws the switch arm 113 open and the paper feed roller 17 stops. How this automatic stopping of the feed roller is accomplished by the opening of switch arm 113 will be explained in the description of Fig. 5.

It will be seen that the opening of switch contacts 113—114 is only momentary, for the switch arm 113 moves back to closed position upon the return of spring blade 115. That is to say, when the feed roller 17 stops at the end of one turn, the control switch 113—114 and its operating elements 115 and 117 are back in normal position ready for the next paper feed operation. The size of the feed roller 17 has been so chosen that one turn of it feeds the right amount of paper into the cylindrical former 34. In the particular machine shown in the drawings, the paper on the supply roll 16 is about 3¼ inches wide and the length of the cut record sheets is about 5¼ inches. Of course, these figures are given merely by way of example.

The sequence of operation will now be clear and may be summarized as follows: Assume the flexible band or shell 34 is closed with recording paper inside and the carriage K is held by spring 86 in its initial position at the extreme right. The motors 27 and 52 are running, the stylus shaft 55 rotates in phase with the distant transmitter, and the half-nut 80 is in mesh with the screw shaft 30. The carriage K is therefore moving to the left at slow scanning speed—say, at the rate of 100 lines per inch. The stylus 64 receives electric signals from the transmitter and records them on the inner surface of the stationary sheet 21 held inside the cylindrical band 34. The synchronous motor 52 which operates the stylus may be started automatically from the transmitter or by means of a switch at the recorder.

As seen in Fig. 2, the projecting end 21*b* of the paper extends far enough under the sheet to form a practically continuous cylindrical surface on which the stylus operates. The only break in this cylindrical scanning surface is the thickness of the paper at the edge of the end projection 21*b*, but the stylus rides easily over this edge as it rotates in the direction of arrow *d* in Fig. 2. It goes without saying that the stylus 64 receives no signal impulses as it crosses the edge of the overlapping portion 21*b*.

When the scanning is completed and the carriage K has reached the end of its movement to the left, the following operations take place automatically: The magnet 43 is energized to open the band 34; the magnet 81 is deenergized to release the half-nut 80 from screw shaft 30 and allow the spring 86 to return the carriage K to the right; the motor 27 is reversed to feed a fresh length of paper into the open band 34 and at the same time project the recorded sheet out of the band; the magnet 74 is energized to keep the stylus 64 off the paper during the feed cycle; the cutting magnet 102 is energized to shear off the projected record; and finally the magnet 43 is deenergized to let the spring 44 close the flexible former 34 with fresh paper inside. The machine is now ready for the next recording operation.

Figure 5:
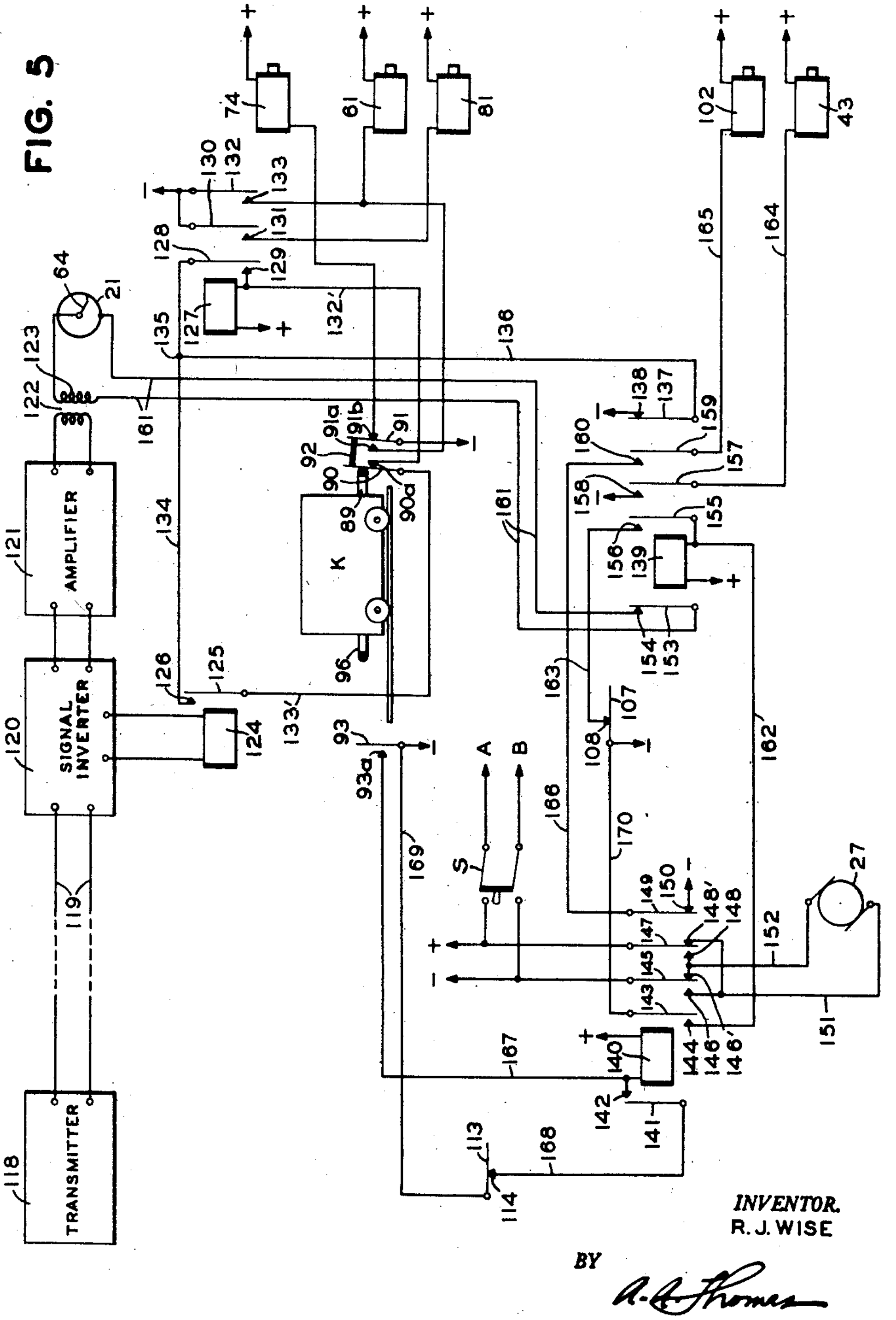
Fig. 5 is a schematic diagram of the circuits that control the timed operation of certain parts.

Referring to Fig. 5, I shall now explain the control circuits by which the various operations described in the preceding paragraph are automatically carried out in proper sequence. The signal impulses generated in the transmitter 118 by the scanned copy pass through the line 119 to a signal inverter 120, then through an amplifier 121 to a transformer 122. The amplifier 121 may not be necessary in all cases. The secondary 123 of the transformer 122 is connected in the recording circuit of stylus 64. I need not go further into the transmission system to which the recording stylus is connected, for it is only necessary to an understanding of my recording machine to say that the electric stylus is subjected to signal impulses representing the subject matter scanned at the transmitter.

A suitable source of direct current potential is indicated by a pair of bus bars A and B, which represent the positive and negative sides of the power circuit. It will be understood that a line or contact marked with a plus (+) sign is connected to bus bar A and a minus (−) sign means that a line or contact goes to the bus bar B. This simplifies the diagram and makes it easier to trace the circuits. In the description that follows it is to be assumed that the power switch S is closed. Whenever I use the term wire in describing circuits, I mean any practical form of electric connection.

A relay 124 is connected to the signal inverter 120 so as to be energized by the carrier frequency coming over line 119. When the relay is energized a movable contact member 125 closes the normally open contact 126. The closed contacts 125–126 close the circuit of another relay 127, which has three pairs of make contacts numbered 128—129, 130—131, and 132—133. The contacts 128, 130 and 132 are movable switch members normally in the open positions indicated when the relay is deenergized. The closing of relay switch 125—126 closes the circuit of relay 127 through wire 132′, closed switch 90—90*a*, wire 133′, closed relay contacts 125—126, wire 134 to point 135, wire 136 and through a pair of closed contacts 137—138 associated with a relay 139 which at this time is deenergized. The energizing of relay 127 simultaneously energizes the phasing magnet 61 through closed contacts 132—133 and the half-nut magnet 81 through closed contacts 130—131. Consequently, the stylus shaft 55 rotates and the carriage assembly K starts moving to the left in phase with the scanned copy in the transmitter.

The energized relay 127 locks itself through contacts 128—129, so that it remains energized even when the carriage K moves away from the contacts 90—90*a* which thereupon open. The circuit of stylus lifting magnet 74 is closed through contacts 91—91*b*, whereby this magnet remains energized as long as the carriage K is in its initial position. When the carriage starts moving to the left, the contacts 91—91*b* are opened and the contacts 91—91*a* are closed. This deenergizes the stylus magnet 74 and locks the circuit of the phasing magnet 61 through the closed contacts 91—91*a* independently of the relay contacts 132—133. The reason for this will appear later.

The reversible motor 27, which operates not only the screw shaft 30 but also the feed roller 17, is energized when the power switch 123 is closed. This motor is controlled by a relay 140 which operates five pairs of contacts numbered, respectivley, 141—142, 143—144, 145—146, 147—148 and 149—150. The contacts 141, 143, 145, 147 and 149 are movable switch members which operate as a unit. The fixed contacts 142, 144, 146 and 148 are normally open, while the contact 150 is normally closed. The movable contact members 145 and 147 normally engage contacts 146′ and 148′, respectively. The contacts 146 and 148′ are connected together and go to one side of the motor circuit through a wire 151, while the other side of this circuit goes through a wire 152 to the connected contacts 146′ and 148. The contact 150 is connected to the negative side or bus bar B of the power circuit.

As long as the relay 140 remains unenergized, the direct current flows through the motor 27 as follows: From the positive or A conductor through the closed switch 147—148′, wire 151, through the motor windings in a certain direction, and by wire 152 through closed switch 145—146′ back to the return main B of the power circuit. This operates the motor 27 to drive the gear wheel 29 in the direction of arrow $a$ (see Fig. 1) during the scanning operation.

The relay 139 operates five pairs of contacts 153—154, 155—156, 157—158, 159—160 and the contacts 137—138 previously mentioned. The contacts 153, 155, 157, 159 and 137 are movable members operating as a unit. The fixed contacts 154 and 138 are normally closed, while the other contacts 156, 158 and 160 are normally open. The contacts 138 and 158 are connected to the negative side B of the direct current power source. The contacts 153—154 constitute a normally closed switch in the secondary circuit 161 of the recording transformer 122. While this switch is not absolutely necessary, I prefer to use it in some installations to cut the recording transformer out of circuit when the relay 139 is energized during the loading cycle.

The contact arm 155 of relay 139 is connected to condctor 162 of the relay circuit and this conductor goes to contact 144 of the relay 140. The normally open contact 156 is connected by a wire 163 to switch contact 108 which, as previously explained, is associated with the cutting blade 97. The contact arm 157 is connected to a wire 164 in the circuit of solenoid 43 which opens the flexible band 34 after a recording operation. The contact arm 159 of relay 139 is connected to a wire 165 in the circuit of solenoid 102 which operates the cutting blade 97. The fixed contact 160 of relay 139 is connected by a wire 166 to the movable contact member 149 of relay 140.

The energizing circuit of relay 140 includes a conductor 167 which is connected to the contact 93$a$ associated with the scanning carriage K. The contact 142 is also connected to conductor 167 and the movable contact member 141 is connected by a wire 168 to contact 114 of the switch that controls the paper feeding operation of motor 27. The switch arm 113, associated with contact 114, is connected by a wire 169 to the switch arm 93 controlled by carriage K. The switch arm 93 and conductor 169 are connected to the negative bus bar B.

We are now able to follow the operation of the various control circuits in Fig. 5. Assuming that the relay 124 is energized by carrier frequency from the transmitter 118, the circuit of relay 127 is closed through the connections previously described. The energized relay 127 locks itself through the closed contacts 128—129, so that the breaking of contacts 90—90$a$ by the moving carriage K has no effect on the relay. The closing of contacts 130—131 and 132—133 by the energized relay 127 operates the half-nut magnet 81 and the phasing magnet 61, respectively, so that the carriage K is now moving forward and the stylus shaft 55 is rotating.

The machine is now recording and nothing happens in the control circuits of Fig. 5 until the pin 96 on the front of carriage K closes the switch contacts 93—93$a$, which close the circuit of relay 140 through conductor 167. The energized relay 140 locks itself through the closed contacts 141—142, wire 168, closed switch 113—114 and the ground wire 169. The closing of contacts 143—144 energizes the relay 139 through wire 162, contacts 143—144 and through wire 170 which is connected to the negative bus bar B. The relay 139 locks itself through the closed contacts 155—156 and the closed switch 107—108. The opening of contacts 137—138 by the energized relay 139 breaks the circuit of relay 127, so that the half-nut magnet 81 is deenergized. However, the phasing magnet 61 remains energized through the closed contacts 91—91$a$, so that the stylus 64 keeps on rotating as the carriage K is released from the screw shaft 30 for instant return to initial position by the spring 86.

Although the stylus point remains in contact with the paper during the return movement of the carriage, the rapid backward rotation of the stylus causes it to contact the paper surface in a spiral without tearing the record. It will be seen that the opening of switch contacts 93—93$a$ by the returning carriage has no effect on relay 140 which remains energized through contacts 141—142 and the closed switch 113—114. When the released carriage K reaches its initial position, as indicated in Fig. 5, the opening of contact 91$a$ deenergizes the phasing magnet 61, so that the stylus stops rotating, and the closing of contact 91$b$ energizes the stylus magnet 74. Therefore, the stylus is automatically lifted off the paper for the feeding operation that is to follow.

The closing of contacts 157—158 by the energized relay 139 energizes the solenoid 43 which opens the flexible band 34 to the position shown in Fig. 1. Although the contacts 159—160 are also closed when the relay 139 is energized, the circuit of the cutting magnet 102 is still open because the energized relay 140 holds the contacts 149—150 open. That is to say, as long as the relay 140 is energized the cutting operation cannot take place, and that is as it should be, for it is first necessary to reverse the operation of motor 27 and feed fresh paper into the cylinder former 34.

The reversal of motor 27 for the paper feeding operation is effected by the movable contacts 145 and 147 when the relay 140 is energized thereby closing the contacts 145—146 and 147—148. The current now flows through the motor 27 as follows: from the positive main A through closed contacts 147—148, conductor 152, through the motor windings in a direction opposite to the previous flow, conductor 151 and through closed contacts 145—146 to the return main B. The motor 27 is now turning the gear wheel 29 in the direction of arrow $b$ (see Fig. 1) and the pawl 25 couples the feed roller 17 to the motor, as heretofore described. After a definite length of fresh paper has been fed into the open shell 34, the pin 117 on ratchet disc 23 opens the switch arm 113 and breaks the circuit of relay 140. The motor 27 instantly reverses its direction of operation and the feed roller 17 stops. As previously mentioned, the magnet 74 is energized during the feeding operation to lift the stylus 64 off the moving paper.

The deenergizing of relay 140 at the close of the paper feed cycle does not affect the relay 139 which remains energized through closed contacts 155—156 and the closed switch 107—108. The cutter magnet 102 is now energized through wire 165, closed contacts 159—160, wire 166 and closed contacts 149—150. The shear blade 97 is operated to cut off the recorded sheet 21$a$ protruding from the flexible band 34 and thereupon the switch 107—108 is opened to deenergize the relay 139. This also deenergizes the magnet 43 and the spring 44 closes the flexible band 34 for the next recording operation. The severed sheets may be guided to a suitable receptacle as they drop off.

It will be apparent from the foregoing description that I have provided a recording machine which takes care of itself once it is started and records the messages coming from the transmitter without the attention of an operator. The recording is done on paper fed automatically from a continuous roll and the recorded messages leave the machine as separate cards or sheets of the required size. Although this machine was primarily designed to make recordings on specially stiff paper, I do not intend to be restricted to the use of such paper in the practical application of my invention, which contains novel features adapted for use with other kinds of recording paper. Believing that I am the first to provide a facsimile machine with a drum structure in which a flexible wrapper is operated to coil a paper blank into a complete cylinder for inside scanning, I claim this idea in a fundamental way. Furthermore, as the claims show, certain features of this invention do not necessarily require an electric recording stylus but may be used with other types of recording devices.

The particular machine illustrated in the drawings and described in this specification is to be considered merely as one form of my invention and not as a limitation thereof. Nor is it necessary that all the features of my invention be embodied in the same machine, for some features may be used without others. Obviously, various changes and modifications are possible within the scope of the appended claims.

I claim:

1. In facsimile apparatus, an adjustable cylindrical member having closed and open positions, means for closing said member to form a cylinder adapted to enclose a recording sheet and hold it in cylindrical form, means whereby the inner surface of the enclosed sheet remains exposed for scanning, a recording device for scanning the inner surface of the enclosed sheet, means for opening said member after a recording operation, and means on said member for holding the sheet slidably connected to said member, whereby the latter carries the connected sheet to closed and open positions.

2. In facsimile apparatus, a flexible former of generally rectangular shape, said former being pivotally mounted at one end and freely movable at the opposite end so as to be operable to closed and open positions, means connected to the free end of said former for flexing the same into a cylinder adapted to enclose a sheet of recording paper and hold it in cylindrical form for scanning, means for recording on the inner surface of the cylindrical sheet, means for opening the sheet holding cylinder after a recording, and guide pieces on the free end of said former adapted to receive the sides of the paper in slidable holding engagement whereby the paper is releasably attached to the former and is carried along by the movements thereof to closed and open positions.

3. In a facsimile machine, a flexible member mounted so as to have a closed cylindrical position and an open position, said member when closed being adapted to enclose a recording sheet, a pair of fixed circular members cooperating with said flexible member when closed to hold said sheet in cylindrical form for inside scanning, an electric stylus mounted to scan the inside surface of said cylindrical sheet, at least one of said members constituting an electric contact in the stylus circuit, and means for opening said flexible member for removal of a recorded sheet.

4. In a facsimile machine, a flexible cylindrical shell adapted to enclose a recording sheet in cylindrical form, means cooperating with said shell to support the enclosed sheet only at the edges for inside scanning, an electric stylus for making a facsimile record on the inner surface of the enclosed cylindrical sheet, and means for opening said shell for removal of the recorded sheet.

5. In a facsimile machine, means for holding stiff recording paper in cylindrical form for scanning, said holding means comprising a flexible cylindrical shell separable lengthwise to provide a movable end, the other end of the shell forming a pivotal mounting, operative connections attached to the movable end of said shell for closing and opening the same, and means for recording on the inner surface of the cylindrical paper.

6. In a facsimile machine, means for holding recording paper in cylindrical form for scanning, said holding means comprising a flexible cylindrical shell separable lengthwise to open the shell, springs means for holding the shell closed, and electromagnetic means for opening the shell.

7. In a facsimile machine, means for supporting a sheet of recording paper in cylindrical form for scanning, said paper being fed from a supply roll, scanning mechanism including a reciprocable carriage having a fixed path of travel from starting to final position and back again, an electric motor for operating said carriage, driving connections between said motor and said supply roll, means for holding said connections inoperative during the forward scanning movement of the carriage, and means controlled by one of the end positions of said carriage for rendering said driving connections operative for a predetermined interval.

8. In a facsimile machine, a pair of axially spaced annular members, a flexible wrapper separable lengthwise and movable to closed and open positions, said wrapper when open being adapted to receive a recording sheet, means for flexing said wrapper around said annular members to form the enclosed sheet into a closed paper cylinder, said annular members being arranged to engage only the ends of said paper cylinder whereby the inner surface of the cylindrical sheet remains uncovered for inside scanning, a rotary shaft extending through one of said annular members into the cylindrical sheet, means for causing relative axial movement between said shaft and said cylindrical sheet during rotation of the shaft, a recording stylus carried by said shaft for scanning contact with the inner surface of the sheet, and means for opening said wrapper after a recording operation for removal of the recorded sheet.

9. In a facsimile recording system, recording mechanism including a copyholder, means for loading said copyholder with a fresh sheet fed from a supply roll after each recording operation, an electric stylus for recording on the sheet supported by the copyholder, a recording circuit for said stylus including a transformer, and means for automatically disconnecting said transformer from the stylus during the loading operation.

10. Facsimile apparatus comprising means for supporting a recording sheet in cylindrical form for inside scanning, means for feeding said sheet from a roll of paper, a rotary scanning shaft mounted on a slidable support and carrying a pivoted spring-pressed recording stylus to engage the inside surface of said sheet, a lateral extension on said stylus, and a magnet for acting on said extension to move the stylus from the paper during the feeding operation.

11. In a facsimile machine, recording apparatus including a rotary scanning shaft, mechanism for feeding a sheet of paper from a roll into recording position, said mechanism including a rotary feed shaft, an electric motor, and connections whereby rotation of said motor in one direction operates said scanning shaft for recording and reverse rotation of the motor operates said feed shaft.

12. In a facsimile recorder, means for holding a recording blank in cylindrical form for scanning, a roller for feeding a definite length of paper from a supply roll to said holding means, said definite length of paper being measured by one turn of said roller, means for operating said roller, and means controlled by the rotary movement of said roller for automatically stopping the feeding action of the roller at the end of one turn.

13. In a facsimile recorder, a flexible former adapted to be bent into cylindrical shape, means for feeding a definite length of recording paper from a supply roll into said former which holds the paper in cylindrical form for internal recording, said means including a feed roller and a motor for operating the same, the diameter of said roller being such that a predetermined circumferential movement of the roller represents said definite length of paper, and means controlled by the movement of said roller for automatically causing said motor to stop said feed roller at the end of said predetermined circumferential movement.

14. In a facsimile machine, recording apparatus including a rotary scanning shaft, a gear fixed on said shaft, a motor for driving said gear in either direction, mechanism for feeding a sheet of paper from a roll into recording position, said mechanism including a rotary feed shaft, a gear idly mounted on said feed shaft and arranged in mesh with said gear on the scanning shaft, a driving member fixed on said feed shaft which remains stationary during the recording movement of the scanning shaft, and means whereby the reverse rotation of said meshing gears by the motor after a recording operation automatically couples the idle gear to said driving member for operating the feed shaft a predetermined amount.

15. In a facsimile machine, a flexible cylindrical shell for supporting therein a definite length of recording paper fed from a roll and held in cylindrical form by said shell, said shell being separable lengthwise and flexible to open and closed positions, a recording member operatively supported within said shell for scanning the inner cylindrical surface of the paper, connections for automatically opening said shell at the end of a recording operation, means for projecting the recorded portion of the paper out of the opened shell, and cutting means automatically energized at the end of said projecting operation for severing the projected record sheet.

16. In a facsimile machine, a cylindrical shell movable to closed and open positions, means for feeding a sheet of recording paper from a roll into said shell which holds the paper in cylindrical form for scanning when the shell is closed, means for recording on the inner surface of the cylindrical sheet, automatic means for opening said shell after a recording operation, said feeding means projecting the recorded sheet out of the open shell, a shearing device for severing the projected sheet on a line parallel with the edge of the open shell, and an electromagnet automatically energized after the operation of said feeding means for actuating said shearing device.

17. In a facsimile recording machine, a flexible cylindrical shell adapted to be closed and opened lengthwise, means for feeding a definite length of recording paper from a roll into said shell which holds the paper in cylindrical form for inside scanning, a recording member operable to scan the inner surface of the cylindrical paper while the shell is closed, means for automatically opening the shell after a recording operation, a motor for operating said feeding means to feed a new length of paper into the open shell and thereby project the recorded sheet out of the shell, means for severing the projected sheet, and means for closing the shell after severing of the recorded sheet.

18. In a facsimile recorder, means for holding a recording blank in cylindrical form for internal scanning, said holding means including a flexible band which surrounds the blank, means for holding said band in cylindrical form during the recording operation, means for recording on the inner surface of the supported blank, an electromagnet for opening said band after a recording operation, means for feeding a fresh blank from a supply roll into the open band and thereby projecting the recorded portion of the paper out of said band, means for cutting off the projected record, and means for deenergizing said magnet after the cutting operation whereby the band is closed again for the next recording.

19. In a facsimile recording machine, means for supporting a sheet in cylindrical form for internal recording, an electric stylus for recording on said sheet, said supporting means holding the sheet stationary during the recording operation, a slidable frame on which said stylus is mounted for slowly feeding the stylus axially forward through the cylindrical sheet, means for rapidly rotating the stylus during the feeding movement of said frame to make a recording on the inner surface of said sheet, means for quickly returning said frame to initial position at the end of a recording operation while the stylus continues to rotate rapidly in contact with the record which remains free from injury by the rapid back spiraling of the stylus, and means for automatically stopping rotation of the stylus when said frame reaches its initial position.

20. In a facsimile recording system, a flexible cylindrical shell adapted to be closed and opened lengthwise, means for feeding a definite length of recording paper from a roll into said shell which holds the paper in cylindrical form for inside scanning, a recording member for scanning the inner surface of the cylindrical paper while the shell is closed, means for opening the shell after a recording operation, means for operating said feeding means to feed a new length of paper into the open shell and thereby project the recorded sheet out of the shell, means for cutting off the projected sheet, means for closing the shell after said cutting operation, and means whereby said operations of opening the shell, feeding a new supply of paper into the shell, cutting off the recorded sheet and closing the shell again are performed in automatic sequence after each recording operation.

21. A facsimile machine having a stationary cylindrical support, a flexible wrapper of generally rectangular shape adapted to enclose a sheet of paper, automatic means for flexing said wrapper and the enclosed sheet around said cylindrical support which cooperates with said wrapper to form the enclosed sheet into a substantially perfect cylinder for inside scanning, means for scanning the inner surface of said paper cylinder, and automatic means operable after a scanning operation for unflexing said wrapper and sheet out of engagement with said stationary support.

22. In facsimile apparatus, a stationary cylindrical support, a flexible band of generally rectangular shape supported at its rear end and movable at the forward end, means for wrapping said band around said cylindrical support to form a hollow cylinder adapted to enclose a recording sheet and hold it in cylindrical form, said cylindrical support leaving the inner surface of the enclosed sheet uncovered for recording thereon, and means for opening the closed band for removal of the recorded sheet, both of said band operating means being connected to the forward end of said flexible band.

23. In a facsimile machine, a drum structure comprising a flexible cylindrical shell adapted to enclose a sheet and stationary means cooperating with said flexible shell to hold said sheet in cylindrical form for scanning on its inner surface, said shell being separable lengthwise for the insertion and removal of a sheet, and means connected to said shell for opening and closing the same.

24. In a facsimile machine, means for holding a sheet of paper in cylindrical form for scanning, said holding means comprising a cylindrical shell separable lengthwise, means for holding the shell closed during scanning of the enclosed sheet, and automatic means for opening the shell after a scanning operation.

25. In a facsimile machine, a flexible wrapper adapted to receive a sheet of paper to be scanned, means for flexing the wrapper into cylindrical form to coil the sheet inside the wrapper into a cylinder for internal scanning, a device having a scanning element arranged inside the closed wrapper to scan the inner surface of the enclosed sheet, and means for opening the wrapper to release the scanned sheet.

26. A facsimile machine having a flexible wrapper adapted to receive a sheet of paper to be scanned, cylindrical supporting means associated with said wrapper, and means for closing said wrapper around said supporting means to form a complete cylinder in which the wrapped sheet is supported in perfect cylindrical form for inside scanning.

27. In a facsimile machine, sheet supporting mechanism comprising a flexible wrapper supported at one end and movable at the other, said wrapper being adapted to receive a sheet of paper, means connected to the movable end of said wrapper for flexing the same into cylindrical form, whereby the sheet of paper inside the wrapper is coiled up and supported as a hollow cylinder, and means cooperating with said wrapper to leave the inner surface of the paper cylinder uncovered for scanning.

28. In a facsimile machine, a flexible wrapper adapted to receive a sheet of paper, means for closing said wrapper into cylindrical form whereby the enclosed sheet is coiled into a cylinder for inside scanning, means for opening said wrapper to uncoil the scanned sheet, and means whereby the closing and opening operations of the wrapper are automatically performed at predetermined intervals.

29. In a facsimile machine, a cylindrical shell mounted at one end and movable at the other end to closed and open positions, said shell when open permitting the insertion and removal of a sheet, means cooperating with said shell when closed to hold the enclosed sheet in cylindrical form for scanning, and automatic operating means connected to the movable end of said shell for closing and opening the same at predetermined intervals.

30. In a facsimile machine, a cylindrical shell adapted to close and open, means for feeding a measured length of paper from a supply roll into said shell while it is open, means for automatically closing the shell after said feeding operation to coil the enclosed paper into a cylinder for scanning, a device for scanning said paper cylinder on its inner surface, and means for automatically opening the shell after a scanning operation.

31. In a facsimile recording system, recording mechanism including a copyholder, means for automatically loading said copyholder with a fresh sheet fed from a supply roll after each recording operation, an electric stylus for recording on the sheet supported by the copyholder, a recording circuit for the stylus, and means for automatically disconnecting the stylus from the circuit during the loading operation.

32. In a facsimile machine, recording apparatus having a rotary scanning shaft which operates a stylus, mechanism for feeding a sheet of paper from a supply roll into cylindrical position for internal scanning by said stylus, said mechanism including a rotary feed shaft which normally is stationary, an electric motor for operating said scanning shaft, and means whereby said motor automatically operates said feed shaft after scanning of said sheet to feed a new sheet into recording position.

33. In a facsimile card recorder, a flexible wrapper having open and closed positions and adapted when open to receive a definite length of card-like paper from a supply roll, means for flexing the wrapper into closed cylindrical form whereby the paper inside the wrapper is coiled into a hollow cylinder, a device for recording on the inner surface of the paper cylinder, means for automatically opening the wrapper after a recording operation, and means for feeding a definite length of paper into the open wrapper and thereby projecting the recorded sheet out of the open wrapper for removal.

34. In a facsimile recorder, means for holding a recording blank in cylindrical form for internal scanning, said holding means including a flexible wrapper which encloses the blank, means for holding said wrapper in cylindrical form during a recording operation, means for recording on the inner surface of the supported blank, means for opening said wrapper after a recording operation, means for feeding a fresh blank from a supply roll into the open wrapper and thereby projecting the recorded portion of the paper out of the wrapper, and automatic means timed to operate after said feeding operation for cutting off the projected record.

35. In a facsimile recording machine, a cylindrical shell movable to closed and open positions, means for feeding a sheet of recording paper from a supply roll into said shell which holds the paper in cylindrical form for scanning when the shell is closed, means for recording on the inner surface of the cylindrical sheet, means for opening said shell after a recording operation, said feeding means projecting the recorded sheet out of the open shell, a shearing device for severing the projected sheet, and electromagnetic means automatically energized after said sheet projecting operation to actuate said shearing device.

36. In a facsimile recording system, a flexible cylindrical shell adapted to be closed and opened lengthwise, means for feeding a definite length of recording paper from a supply roll into said shell which holds the paper in cylindrical form for inside scanning by a recording member while the shell is closed, means for opening the shell after a recording operation, means for operating said feeding means to feed a new length of paper into the open shell whereby the recorded sheet is projected out of the shell, means for cutting off the projected sheet, and means whereby said operations of opening the shell, feeding a new supply of paper into the shell and cutting off the recorded sheet are performed in automatic sequence after each recording operation.

37. In facsimile apparatus, a flexible wrapper adapted to receive a sheet of recording paper, a stationary cylindrical support, means for flexing said wrapper around said cylindrical support whereby the enclosed sheet is coiled up into a substantially complete cylinder and held in cylindrical form for scanning, a device for scanning the inner surface of the paper cylinder enclosed inside the wrapper, and means for automatically opening the closed wrapper after a recording operation for removal of the scanned sheet.

38. In a facsimile machine, a flexible member adapted to form a cylindrical shell which encloses a sheet to be scanned and holds it in cylindrical form for inside scanning, means for scanning the inner surface of the cylindrical sheet, said shell being separable lengthwise and flexible into closed and open positions, means for flexing said shell and the enclosed sheet into cylindrical form, and means for automatically unflexing said shell at the close of a scanning operation for removal of the scanned sheet.

39. In a facsimile recorder, means for supporting a supply roll of recording paper, a paper feed roller mounted parallel to said supply roll, and a cylindrical shell mounted parallel to said feed roller and closely adjacent thereto for receiving a definite length of paper from said roller and holding it in cylindrical form for inside scanning, the relative arrangement of said feed roller and shell causing the paper to pass around the roller into the shell through reversely curved loops formed by said roller and shell, said loops providing a short S-shaped path for feeding the paper from the roller directly into the shell which automatically curves it into smooth cylindrical form.

40. In a facsimile machine, a drum structure for supporting a paper blank in cylindrical form for inside scanning, said drum structure comprising a flexible wrapper and stationary cylindrical means to form said wrapper into a substantially complete cylinder when the wrapper is flexed around said cylindrical shaping means, said wrapper being adapted to enclose a paper blank and hold it in perfect cylindrical form for inside scanning when the wrapper is flexed into a cylinder, operating mechanism connected to said wrapper for flexing and unflexing the same, means for actuating said mechanism to flex the wrapper into closed cylindrical form, and means for actuating said mechanism to unflex or open the wrapper for removing a scanned blank and inserting a new blank.

41. In a facsimile machine, the combination of a rotary scanning element and a drum structure for supporting a paper blank in cylindrical form for inside scanning by said element, said drum structure comprising a flexible wrapper and stationary cylindrical means arranged to form said wrapper into a substantially complete cylinder when the wrapper is flexed around said cylindrical shaping means, said wrapper being adapted to enclose a paper blank in perfect cylindrical form for inside scanning when the wrapper is flexed into a cylinder, operating mechanism connected to said wrapper for flexing and unflexing the same, means for actuating said mechanism to flex the wrapper into closed cylindrical form and hold it closed while the scanning goes on, connections for causing relative axial displacement of the wrapped blank and the scanning element during a scanning operation, and means for automatically operating said mechanism to open the wrapper at the close of a scanning cycle for removing a scanned blank and inserting a new blank.

RALEIGH J. WISE.

REFERENCES CITED

The following references are of record in the file of this patent:

UNITED STATES PATENTS

| Number | Name | Date |
|---|---|---|
| 1,545,897 | Haynes | July 14, 1925 |
| 1,635,324 | Jenkins | July 12, 1927 |
| 1,746,407 | Schroter et al. | Feb. 11, 1930 |
| 2,127,331 | Fulton | Aug. 16, 1938 |
| 2,153,917 | Exline | Apr. 11, 1939 |
| 2,223,913 | Johnston | Dec. 3, 1940 |
| 2,229,098 | Kuring | Jan. 21, 1941 |
| 2,312,317 | Burcky | Mar. 2, 1943 |

FOREIGN PATENTS

| Number | Country | Date |
|---|---|---|
| 475,763 | Germany | May 1, 1929 |